United States Patent Office 3,457,626
Patented July 29, 1969

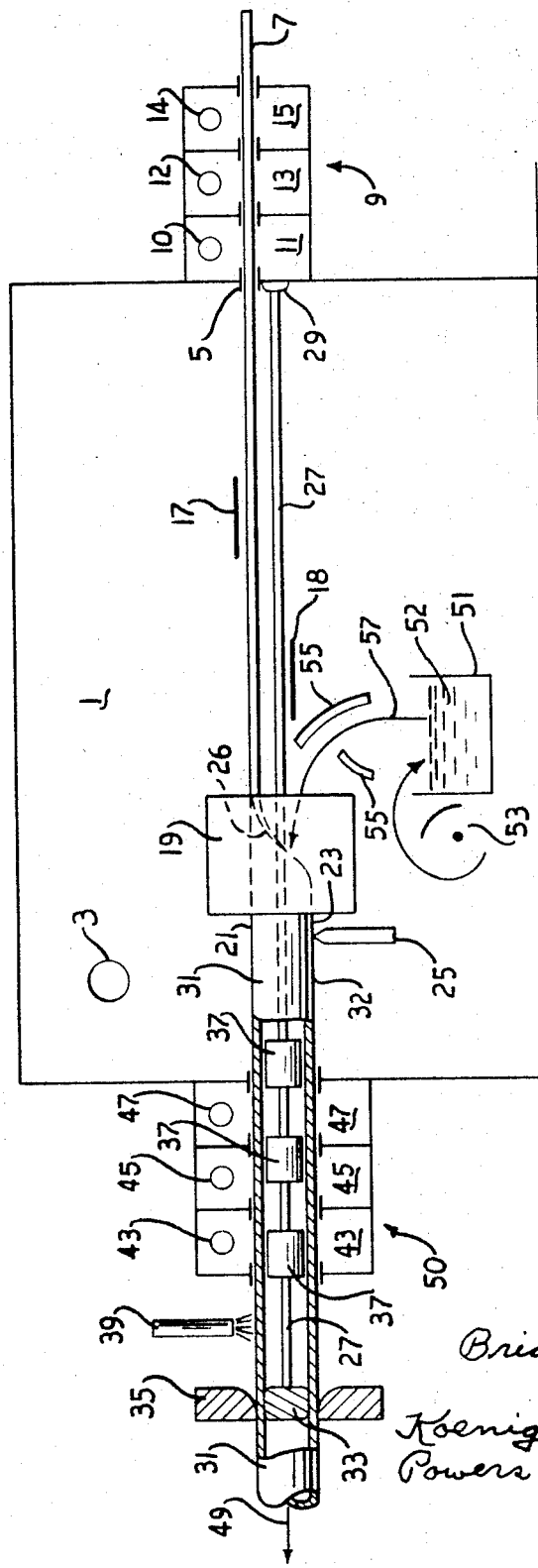

3,457,626
MANUFACTURE OF INTERIORLY COATED TUBING
Brian C. Coad, Fairfield, near Bromsgrove, Worcester, England, assignor to Texas Instruments Incorporated, Dallas, Tex., a corporation of Delaware
Filed Dec. 29, 1966, Ser. No. 605,837
Int. Cl. B23k 31/02; B23p 25/00
U.S. Cl. 29—429                6 Claims

ABSTRACT OF THE DISCLOSURE

This disclosure relates to continuously drawing a precleaned strip of metal past heating and evaporating means for the coating material and deforming the strip to bring the margins of the strip together to form an open-seamed, open-ended tube. The margins of the open seam are welded after the strip has been folded. The evaporated coating material enters the tube through its open end where it is being formed from strip to tube. As a result the inside surface of the tube has evaporated material condensed upon it in solid form. The condensate covers all of the inside surface, including also the welded seam. The inside-coated tube is cooled and passed through an appropriate finishing die or the like.

Background of the invention

The field of art to which the invention relates is the manufacture of internally clad or coated tubing. The cladding or coating of the interior of a continuous or long tubing with a substance different from the material of the tubing itself is very difficult, particularly if the tubing is of small bore. It is possible to precoat or preclad strip then form and seam-weld the material into a tube, but there is then no way of assuring that the seam itself is adequately coated. It is further possible to coat the inside of a fairly large-diameter tube by centrifugal casting of the coating material, but this method is limited to a few materials and combinations of materials. Moreover, very long tubes cannot be made practically in this way.

Summary

The invention comprises the manufacture of interiorly coated or interiorly clad tubing by continuous conversion of strip material into tubular form having an open seam, welding the open seam to close it, forming and introducing evaporated material into the open end of the tube thus being formed, and interiorly condensing the introduced evaporated material on the inside of the tube as it is formed and seamed to coat its inside wall, including the welded seam. Thus internally clad, seamed tubing of any of a large range of bores may be rapidly and continuously turned out in indefinite lengths wherein the entire inner surface is clad, including the seam.

Brief description of the drawing

The single view is a schematic longitudinal section of apparatus for carrying out the invention.

Description of the preferred embodiment

As shown, a chamber 1 is evacuated by a conventional evacuating means connected to an outlet opening such as shown at 3. The vacuum chamber has an inlet 5 through which a clean strip of material 7 (which may be metal) is drawn into the chamber 1, after passing through suitable vacuum sealing means, the assembly of which is indicated generally at numeral 9. This assembly comprises a series of evacuated spaces as indicated at 11, 13 and 15 which are pumped out through ports 10, 12 and 14 at different reduced pressures. Further description of the vacuum sealing means will be unnecessary, since such are known.

After the strip 7 has entered the evacuated chamber 1, it is heated by a suitable conventional heater 17. This may be of the radiant type, an electron beam gun, direct electrical resistance heating of the strip, or the like. At numeral 19 is indicated conventional forming means for crossbending or folding the strip 7 into tubular form as indicated at 21, its margins being brought together at 23. This may be of the known roll-forming, die-folding or other appropriate type to convert the strip into tubular form. The resulting open-seam tubing has an open inlet portion 26 which is presented to the vacuum in chamber 1.

Located beyond and close to the forming means 19 is a seam welding unit 25. This is preferably of the focused electron beam or laser type which acts to produce highly localized and short-lived heating for seam welding, so that the heat for welding does not spread substantially throughout the wall of the formed tubing and unduly modify its preheated condition as brought about by the heater 17. The tubing as welded is numbered 31, and the welded seam is numbered 32.

At numeral 27 is shown a mandrel in the form of a rod, wire or the like which is anchored at 29 at the righthand end of the chamber 1. This extends beneath the strip 7 and into the tubing through its open end 26. It is heated by a heater 18 to a temperature higher than that of the strip 7. At its left end the mandrel 27 carries spaced solid cylinders 37. These form vacuum sealing means for the tube 31 as it emerges from the chamber 1. There is a small clearance between the outside surfaces of the cylinders 37 and the inside surface of the tubing 31 to prevent scarification so as not to interfere with the coating to be placed on the inside of the tube 31.

Around the outlet of the chamber 1 is located a vacuum seal assembly numbered 50. This is like the vacuum seal assembly 9 at the other end of the chamber 1 and consists of a series of chambers 43, 45 and 47 differentially pumped out through openings 44, 46 and 48.

The strip 7 and the tubing 31 are drawn to the left by suitable draw means illustrated by the arrow 49 at the left.

At numeral 51 is illustrated a crucible containing a molten pool of material 52 which it is desired to evaporate to form the inner coating of the finished tubing. The pool may be composed of a metal or nonmetal. At numeral 53 is indicated a conventional electron gun with suitable conventional electrostatic or magnetic focusing means for focusing an electron beam into the pool of material in the cruicible 51. This melts material to form the pool and evaporates the melt to form a gaseous vapor indicated by dart 57. Deflecting shields 55 direct the evaporated material up and transversely into the open end 26 of the tubing 31 as it is being formed by the forming apparatus 19. The temperature of the strip 7 is maintained by heater 17 so that the evaporated material will condense evenly in the tube 31. The temperature of the mandrel 27 is maintained high enough by heating means 18, (not shown in detail) so that condensation will not occur thereon.

The shields 55 serve two purposes: first, to prevent entrained material emitted from the pool source in the form of liquid droplets or "splatter" from coming into contact with and freezing on the tube; and second, to act as a deflector and direction controller for the gaseous vapor, so that the bulk of it will move in a direction parallel to the axis of the formed tube. The evaporation rate is chosen by control of the electron beam so that the stream of gaseous vapor is projected at a pressure such that atoms or molecules will reach and condense evenly all around the inside of the tube, including a coating on the inside of the welded seam 32. Operation is as follows:

The draw means 49 pulls the tubing 31 and the strip 7 to the left. The strip 7 enters the evacuated compartment 1 through the differentially pumped vacuum sealing means 9. As the strip 7 passes the heater 17 it attains a temperature suitable for the best subsequent cohesive and dense condensation evenly spread over the inside of the tubing 31 by whatever coating material is employed. The temperature of the strip as determined by the heater 17 is adjusted to this purpose.

From the heater 17 the strip passes to the apparatus 19 to be converted by curling into the open-seam tubular form 21, with its margins juxtaposed at 23. The welder 25 welds these margins together to form the tube 31 having the closed seam 32.

As the strip 7 is transformed into tubing 31 there is left the opening 26 into which the evaporated material projected from the crucible 51 is deflected by the shields 55. As above mentioned, the heating of the welder 25 is intense, localized and of short duration, so as not substantially to change the over-all temperature of the tubing as determined by heater 17, the purpose of which is to obtain an even condensation effect on the inside of the tube 31. As the tubing 31 moves out of the outlet 41 of the chamber 1 it passes through the vacuum seal assembly 50.

At the point where the tubing 31 passes through the seal 50 it passes also around the cylinders 37. The small clearance between the cylinders 37 and the inside of the tubing allows the as-yet comparatively soft interior coating to pass without damage. After passing the cylinders 37, the coolant applied at 39 hardens the inner evenly spread condensed coating. The tubing 31 then proceeds through a drawing die 35. Inside of the tubing at the die is a fairly closely fitting slug or core piece 33 carried on the end of the mandrel 27. This, along with the cylinders 37, substantially prevents inflow of air into the chamber 1 through the tubing. The die 35 improves the concentricity and smoothness of the finished tube and of working in connection with the core piece 33, which has the effect of mechanically increasing the density of the inside coating.

In view of the above, it will be seen that the several objects of the invention are achieved and other advantageous results attained.

As various changes could be made in the above method and construction without departing from the scope of the invention, it is intended that all matter contained in the above descripion or shown in the accompanying drawing shall be interpreted as illustrative and not in a limiting sense.

I claim:
1. The method of making an internally coated tube, comprising drawing a strip of material through tube-forming means to produce a tube having juxtaposed marginal portions forming an open seam and an open end at the forming means, bonding said marginal portions to form a closed seam, melting and evaporating a material to form a gaseous vapor, and directing said vapor into said open end to form a condensate on the inside of the tube and the closed seam.

2. The method of making an internally coated tube, comprising drawing a strip of material through heating and forming means to produce a heated tube having juxtaposed margins and an open end at the forming means, bonding said margins to form a closed seam, evaporating a material to form a gaseous vapor, and directing said vapor into said open end to form a liquid condensate evenly on the inside of the heated tube and the seam, and cooling the tube to harden the condensate.

3. The method according to claim 2, including drawing the cooled tube through a finishing die provided with a core piece in the tube to finish the exterior surface of the tube and to finish the solid condensate on its interior.

4. The method according to claim 3, including the step of heating the strip prior to the time that it is formed into a tube.

5. The method of making internally coated tubing comprising drawing a metal strip through forming means in a vacuum to form an open-seamed tube having an open end at the forming means exposing the inside of the tube to the vacuum, heating the strip prior to its passage through the forming means, welding said margins beyond said open end in the vacuum, forming a melt of coating material adjacent said open end and in said vacuum, evaporating said melt and directing the evaporated material into said open end to condense on the inside of the tube and the seam in the presence of said vacuum, cooling the internally coated tube to harden the coating, and drawing the tube through a finishing die.

6. The method according to claim 5, wherein the welding step is performed by a focused electron beam.

References Cited

UNITED STATES PATENTS

| | | | |
|---|---|---|---|
| 2,771,669 | 11/1956 | Armstrong et al. | 29—429 |
| 2,982,312 | 5/1961 | Caplan et al. | 138—145 |
| 3,069,763 | 12/1962 | Reynolds | 29—429 |
| 3,197,861 | 8/1965 | Brick | 29—528 |

THOMAS H. EAGER, Primary Examiner

U.S. Cl. X.R.

29—528; 138—143